(12) United States Patent
He et al.

(10) Patent No.: US 12,498,100 B1
(45) Date of Patent: Dec. 16, 2025

(54) LIGHTING DEVICES

(71) Applicant: Olight Group Co., Ltd, Zhongshan (CN)

(72) Inventors: Hangjin He, Zhongshan (CN);
Manchun Cai, Zhongshan (CN);
Ziyang Zhou, Zhongshan (CN)

(73) Assignee: Olight Group Co., Ltd, Zhongshan (CN)

( * ) Notice: Subject to any disclaimer, the term of this patent is extended or adjusted under 35 U.S.C. 154(b) by 0 days.

(21) Appl. No.: 18/953,189

(22) Filed: Nov. 20, 2024

(30) Foreign Application Priority Data

Sep. 30, 2024 (CN) .......................... 202411389167.1

(51) Int. Cl.
| | | |
|---|---|---|
| *F21V 3/02* | (2006.01) | |
| *F21S 9/02* | (2006.01) | |
| *F21V 15/01* | (2006.01) | |
| *F21V 17/10* | (2006.01) | |
| *F21V 21/096* | (2006.01) | |
| *F21V 23/00* | (2015.01) | |
| *F21V 23/04* | (2006.01) | |
| *F21V 23/06* | (2006.01) | |
| *F21V 31/00* | (2006.01) | |
| *F21Y 115/10* | (2016.01) | |

(52) U.S. Cl.
CPC .................................. *F21V 3/02* (2013.01);
*F21S 9/02* (2013.01); *F21V 15/01* (2013.01);
*F21V 17/107* (2013.01); *F21V 21/096*
(2013.01); *F21V 23/002* (2013.01); *F21V
23/04* (2013.01); *F21V 23/06* (2013.01); *F21V
31/005* (2013.01); *F21Y 2115/10* (2016.08)

(58) Field of Classification Search
CPC .......... F21V 3/02; F21V 15/01; F21V 17/107;
F21V 21/096; F21V 23/002; F21V 23/04;
F21V 23/06; F21V 31/005; F21S 9/02;
F21Y 2115/10
See application file for complete search history.

(56) References Cited

U.S. PATENT DOCUMENTS

| 10,274,147 B2 * | 4/2019 | Chou ................... F21V 23/0485 |
| 2010/0277089 A1 * | 11/2010 | Chien .................... H04N 23/65 |
| | | 362/235 |
| 2016/0271458 A1 * | 9/2016 | Lin ....................... G02B 6/0001 |
| 2018/0187872 A1 * | 7/2018 | Chou .................... F21V 23/002 |

* cited by examiner

*Primary Examiner* — Bao Q Truong
(74) *Attorney, Agent, or Firm* — JEEN IP LAW, LLC

(57) ABSTRACT

The present disclosure provides a lighting device having a spherical shaped object called a sphere or a globe. The lighting device has a lamp housing having a spherical receiving space, a lamp source assembly disposed in the spherical receiving space of the lamp housing, a battery assembly and a diffuser, the lamp source assembly having a flexible circuit board and a plurality of lamp beads disposed on the flexible circuit board, the flexible circuit board defining a holding cavity in the shape of a cylinder, a battery assembly electrical connected to the flexible circuit board, the battery assembly being received inside the holding cavity, and the diffuser disposed inside the spherical receiving space and received between the lamp source assembly and the lamp housing, the lamp housing further having a resilient cover which may be pressed to activate a switch to turn the lighting device on or off.

14 Claims, 11 Drawing Sheets

LIGHTING DEVICES

CROSS-REFERENCE TO RELATED APPLICATIONS

The present disclosure claims priority to Chinese Patent Application NO. 202411389167.1 filed on Sep. 30, 2024, the content of which is incorporated herein by reference in its entirety.

TECHNICAL FIELD

The present disclosure relates to a lighting device comprising a spherical shaped object called a sphere or a globe, inside which there is a light source.

BACKGROUND

Lighting device in related technology usually has a light emitting element and a battery in the casing, the battery is connected to the light source, the battery supplies power to the light source, and the light source emits light in one direction or the light source emits light in all directions. However, the light emitting position of the light source is single, the lighting intensity is low, the battery and the light source occupy a large space, which affect each other so that the volume of the light source is small, which reduces the lighting intensity, and the volume of the battery is small and the durability is poor. One solution to achieve uniform illumination of a sphere is to have multiple light sources inside the sphere. One difficulty is that steps must be taken to ensure that each light source has the same lighting characteristics. It is particularly important to control the colour temperature of each light source accurately.

Therefore, it is necessary to provide a lighting device comprising a globe illuminated by a light source located inside the globe, in which the globe provides uniform lighting.

SUMMARY

In view of this, the present disclosure is designed to provide a lighting device comprising a light source inside a globe so that the globe or the light sphere can be treated like an elementary light point or "pixel.". Uniform lighting of the globe means particularly lighting with uniform brightness and colour.

The lighting device has a lamp housing having a spherical receiving space, a lamp source assembly disposed in the spherical receiving space of the lamp housing, a battery assembly and a diffuser, the lamp source assembly having a flexible circuit board and a plurality of lamp beads disposed on the flexible circuit board, the flexible circuit board defining a holding cavity in the shape of a cylinder, a battery assembly electrical connected to the flexible circuit board, at least a portion of the battery assembly being received inside the holding cavity of the flexible circuit board, the diffuser disposed inside the spherical receiving space and received between the lamp source assembly and the lamp housing, the lamp housing further having a resilient cover which may be pressed to activate an internal switch to turn the lighting device on and off.

In accordance with other exemplary embodiments of the disclosure, the battery assembly has a battery compartment mated with the holding cavity, a battery disposed in the battery compartment, a first circuit board connected with the battery compartment, a flexible gasket sandwiched between the first circuit board and the battery for protecting the battery, and a switch disposed on the first circuit board and away from the flexible gasket, and the lamp housing further has a resilient cover corresponding to the switch and capable of activating the switch when pressed by an external force.

In accordance with other exemplary embodiments of the disclosure, the lamp housing includes a lower lamp shell defining a substantially hemispherical shape, an upper lamp shell defining an integrally hemispherical shape, a hinge ring sandwiched between the upper lamp shell and the lower lamp shell and a mounting groove provided in a peripheral edge of the lower lamp shell, the upper lamp shell cooperating with the lower lamp shell and the hinge ring and the resilient cover to form a device having a spherical shape with a smooth surface.

In accordance with other exemplary embodiments of the disclosure, the diffuser includes an upper diffuser matched to the upper lamp shell and a lower diffuser matched to the lower lamp shell, each of the upper diffuser and the lower diffuser having a plurality of prongs for refracting light.

In accordance with other exemplary embodiments of the disclosure, the resilient cover includes a substrate cooperating with the lower lamp shell and a mounting portion extending from the substrate and protruding toward the receiving space of the lamp housing, the mounting portion being used to support a second charging member capable of activating the switch on the first circuit board, a first charging member surrounding the second charging member.

In accordance with other exemplary embodiments of the disclosure, an annular slot is defined on the mounting portion of the resilient cover for receiving a magnetic ring.

In accordance with other exemplary embodiments of the disclosure, a fixing cover is provided on the mounting portion of the resilient cover for preventing the magnetic ring from falling off the resilient cover.

In accordance with other exemplary embodiments of the disclosure, a second circuit board is disposed on the mounting portion of the resilient cover to form a gap with the first circuit board, a first resilient conductive member and a second resilient conductive member are accommodated in the gap for electrical connection.

In accordance with other exemplary embodiments of the disclosure, at least one of the first resilient conductive member and the second resilient conductive member is in the shape of a coil spring.

In accordance with other exemplary embodiments of the disclosure, the second charging member includes a first electrical connector disposed on the mounting portion of the resilient cover and a second electrical connector coaxially connected to the first electrical connector.

In accordance with other exemplary embodiments of the disclosure, the second electrical connector has a cylindrical wide segment connected with the first electrical connector and a fine segment extending coaxially from the wide segment.

In accordance with other exemplary embodiments of the disclosure, the wide segment of the the second electrical connector abuts against the second circuit board.

In accordance with other exemplary embodiments of the disclosure, the fine segment of the the second electrical connector extends through a through hole of the second circuit board towards the switch on the first circuit board.

In accordance with other exemplary embodiments of the disclosure, a radial channel is provided inside the first electrical connector and an axial channel is provided inside the second connector, the radial channel and axial channel being connected to each other to equalize air pressure inside the lighting device.

In accordance with other exemplary embodiments of the disclosure, a waterproof breathable membrane is sandwiched between the first electrical connector and the second electrical connector.

BRIEF DESCRIPTION OF DRAWINGS

Many aspects of the embodiment can be better understood with reference to the following drawings. The components in the drawings are not necessarily drawn to scale, the emphasis instead being placed upon clearly illustrating the principles of the embodiment.

DESECOND ELECTRICAL CONNECTORED DESCRIPTION OF THE PREFERRED EMBODIMENTS

Figure 1:
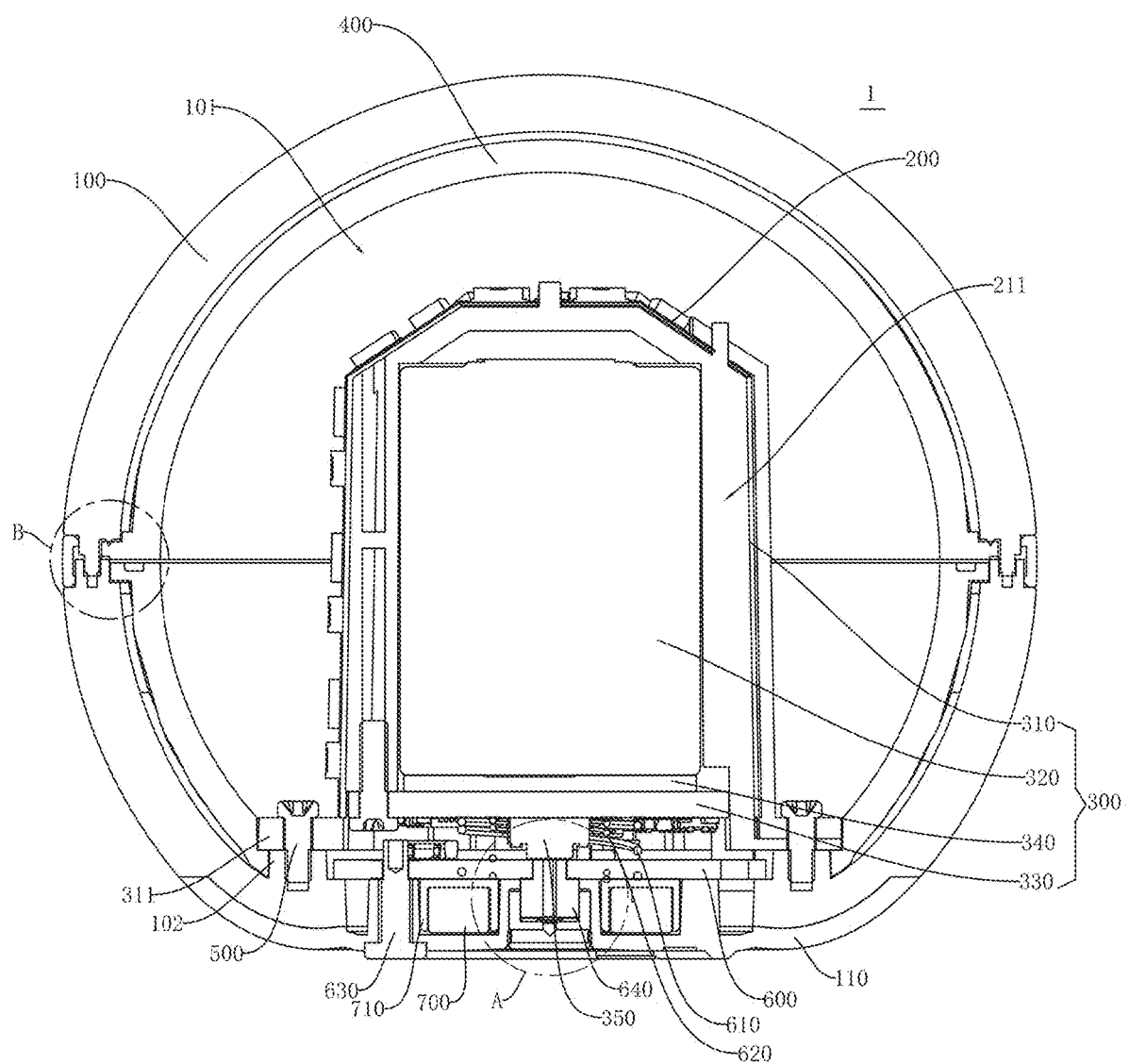
FIG. 1 is a cross-sectional view of a lighting device in accordance with an exemplary embodiment of the present disclosure.

Embodiment of the present disclosure will be described in desecond electrical connector in conjunction with the drawings. It should be noted that the figures are illustrative rather than limiting. The figures are not drawn to scale, do not illustrate every aspect of the described embodiment, and do not limit the scope of the present disclosure.

In the disclosure, the terms "first" and "second" are only used for descriptive purposes and cannot be understood as indicating or implying relative importance or implicitly indicating the number of indicated technical features. Thus, the features defined with "first" and "second" can explicitly or implicitly include one or more of the features. In the description of the invention, "multiple" means two or more, unless otherwise specifically defined.

It is appreciated that the shape of each part described below is "rectangular", "square" indicates a rough shape, and there may be rounded corners between adjacent sides or no rounded corners. Furthermore, the azimuth relationship qualifiers such as "parallel", "vertical", "consistent direction", "same direction", "opposite direction", etc. used by each component described below indicate the approximate orientation that allows for a certain error.

Referring to FIGS. 1 to 11, a lighting device 1 comprises at least a lamp housing 100, a lamp source assembly 200, a battery assembly 300 and a diffuser 400.

The lamp housing 100 is provided with a spherical receiving space 101, the lamp source assembly 200 is disposed inside the receiving space 101 and includes a flexible circuit board 210 and a plurality of lamp beads 220 such as a LED, the flexible circuit board 210 being in the form of an inverted bowl or concave member defining a holding cavity 211. The plurality of lamp beads 220 are disposed on the outer surface of the flexible circuit board 210 in spaced rows. A battery assembly 300 is connected to the flexible circuit board 210. The holding cavity 211 accommodates at least a portion of the battery assembly 300. The diffuser 400 is disposed in the receiving space 101 and is provided between the light source assembly 200 and the lamp housing 100.

In the embodiment, the receiving space 101 may be an enclosed spherical space, and the lamp housing 100 capable of protecting the lamp source assembly 200, the battery component 300, and the diffuser 400. The lamp housing 100 is made of a transparent material or a translucent material. The diffuser 400 transmits light from substantially entire area of its inner surface.

The flexible circuit board 210 is a flexible printed circuit (FPC), and the flexible circuit board 210 may be deformed to be configured to form a columnar receiving cavity 211 having an opening which a battery compartment may be inserted. A plurality of lamp beads 220 are disposed on a surface of the flexible circuit board 210 on a side of the flexible circuit board 210 that is rearwardly of the receiving cavity 211. It will be appreciated that the flexible circuit board 210 forms a cylinder so that enough lamp beads 220 may be arranged on the surface of the cylinder to emit light in different directions, which may be sufficient to improve illumination in the circumferential direction.

The battery assembly 300 supplies power to the light source assembly 200 to enable the light beads 220 to emit light. At least a portion of the battery assembly 300 is accommodated in the columnar containment cavity 211, so that the larger the volume of the battery assembly 300, which means that the larger the surface area of the cartridge formed by the flexible circuit board 210, the larger the number of lamp beads 220 may be arranged which ensures that both the battery assembly 300 and the lamp source assembly 200 have sufficient volume to extend the duration of the lighting device 1, to supply sufficient electrical energy to the lamp source assembly 200, and to provide sufficient electrical energy to the lamp source assembly 200, and to provide sufficient electrical energy to the lamp source assembly 200.

The diffuser 400 is made of transparent material or translucent material. The diffuser 400 may be configured in the shape of a sphere or a crown. As the diffuser 400 is located between the light source assembly 200 and the lamp housing 100, the light from the light source assembly 200 may be diffused by the diffuser 400, thereby expanding the light range of the lighting device 1 and optimizing the lighting effect. In the embodiment, the diffuser 400 is disposed on the inner wall of the lamp housing 100.

Figure 4:
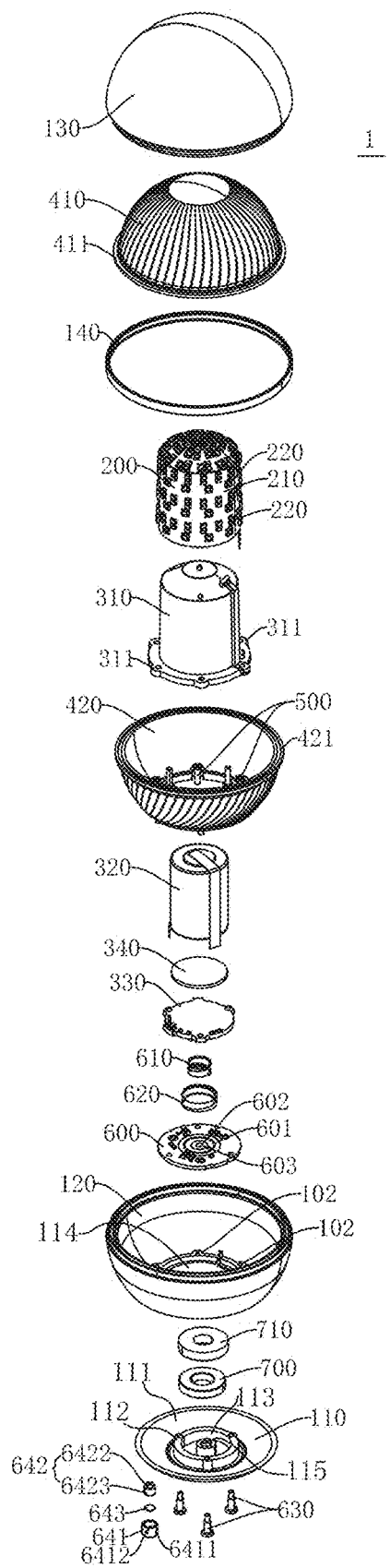
FIG. 4 is an isometric exploded view of the lighting device in FIG. 1.
Figure 7:
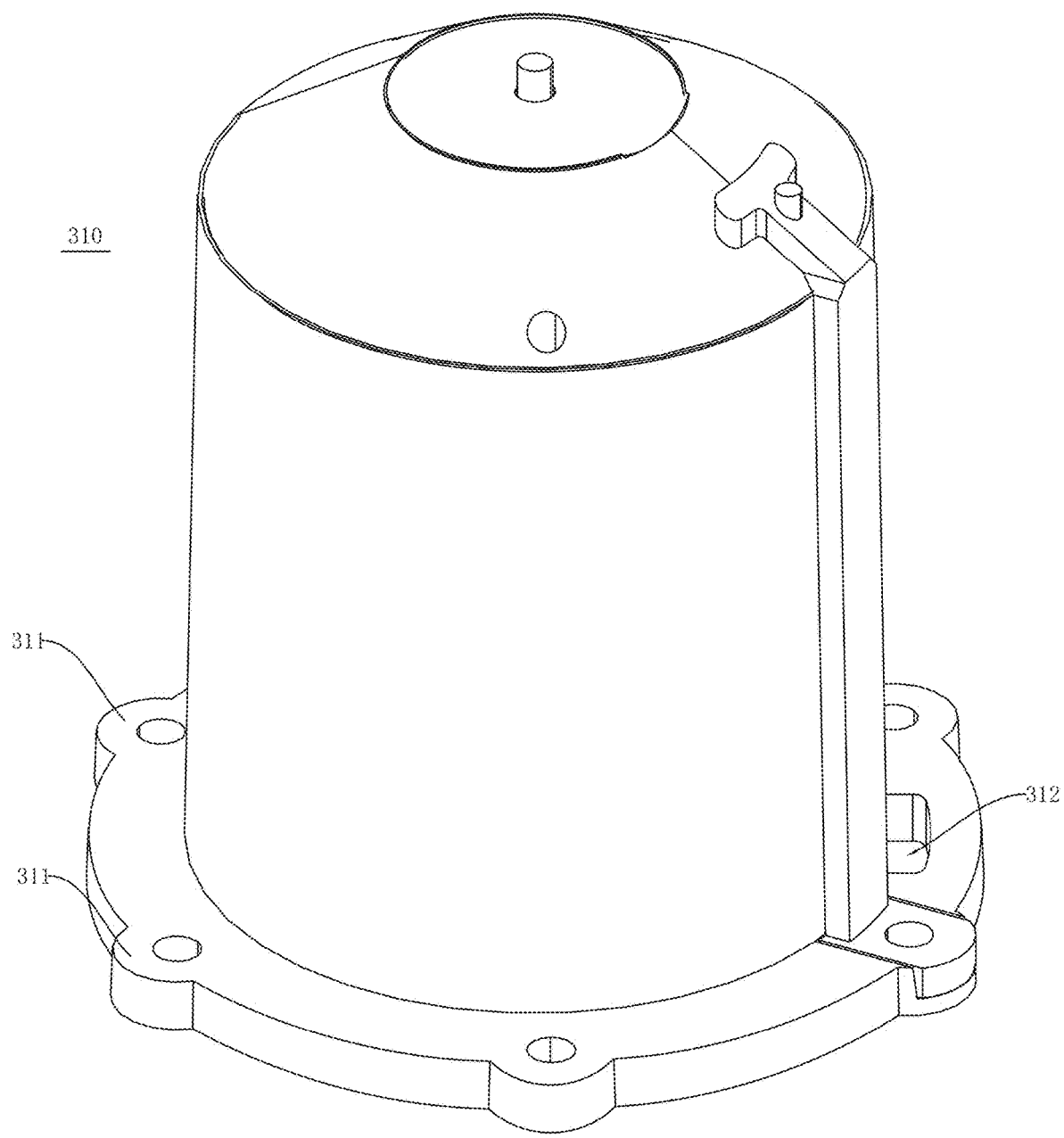
FIG. 7 is an isometric view of a battery compartment of the lighting device in FIG. 1.

Referring to FIGS. 1, 4 and 7, the battery assembly 300 includes a columnar battery compartment 310, a battery 320, a first circuit board 330, a flexible gasket 340, and a switch 350.

In the embodiment, the battery 320 is disposed in the battery compartment 310, and the first circuit board 330 is connected to the battery compartment 310 and disposed in an opening of the battery compartment 310. The first circuit board 330 and the battery 320 are electrically connected, the flexible gasket 340 is disposed between the first circuit board 330 and the battery 320, and the switch 350 is disposed on the back side of the first circuit board 330. The lamp housing 100 comprises a resilient cover 110, the resilient cover 110 is provided in a position corresponding to the position of the switch 350, and the switch 350 is pressed by pressing the resilient cover 110.

The switch 350 is mounted on the first circuit board 330, which may be connected to the battery 320 via a wire harness or a Flexible Printed Circuit (FPC). Pressing the switch 350 may control whether or not the battery 320 supplies power to the flexible circuit board 210 through the first circuit board 330, realizing that the lighting device 1 switches between lighting and stopping lighting.

The resilient cover 110 is capable of elastic deformation, and the resilient cover 110 may be made of silicone material or rubber material. In the case of pressing the resilient cover 110, pressing the switch 350 may be realized to control the lighting device 1 to switch on and off, to switch the working mode or to switch the brightness of the lighting. In the case of stopping pressing the resilient cover 110, the resilient cover 110 may be reset under the action of its own elastic force, so as to facilitate the next pressing use of the resilient cover 110. In the embodiment, the resilient cover 110 is in the shaped of a crown, which is perfectly matched to the lamp housing 100 to form an integrally sphere, the sphere having a rounded shape.

When the first circuit board 330 is subjected to external pressure, the first circuit board 330 applies pressure to the flexible gasket 340, and the flexible gasket 340 is able to deform to absorb the pressure, avoiding the pressure from being directly transmitted to the battery 320, and reducing the probability of the battery 320 being damaged by the force. The flexible gasket 340 may be made of a material such as sponge or silicone.

The first circuit board 330 is connected to the battery compartment 310 and is located in the opening of the battery compartment 310, so that the battery 320 moves out of the battery compartment 310, ensuring the reliability of the relative position between the battery 320 and the battery compartment 310.

As shown in FIGS. 1 and 4, the lighting device 1 further includes a plurality of fixing members 500. An inner surface of the light housing 100 is provided with a plurality of mounting projections 102, the plurality of mounting projections 102 being disposed around the resilient cover 110 along a circumferential direction of the resilient cover 110, and a plurality of mounting ears 311 are provided on an outer periphery of the battery compartment 310, and the plurality of mounting cars 311 are provided at spaced apart intervals along the circumference of the battery compartment 310. The plurality of fixing members 500, the plurality of mounting projections 102, and the plurality of mounting cars 311 are provided in correspondence, and each fixing member 500 is threaded through the corresponding mounting car 311 and mounting projection 102.

The foregoing configuration realizes the fixation between the lamp housing 100 and the battery compartment 310, thereby realizing the fixation of the position of the battery 320 as well as the first circuit board 330 inside the lamp housing 100, reducing the probability of the battery assembly 300 shaking inside the lamp housing 100, and reducing the noise. Said flexible circuit board 210 may be supported on the mounting lugs 311, thereby ensuring that the relative position between the light source assembly 200 and the battery component 300 is fixed and improving the installation precision.

Figure 11:
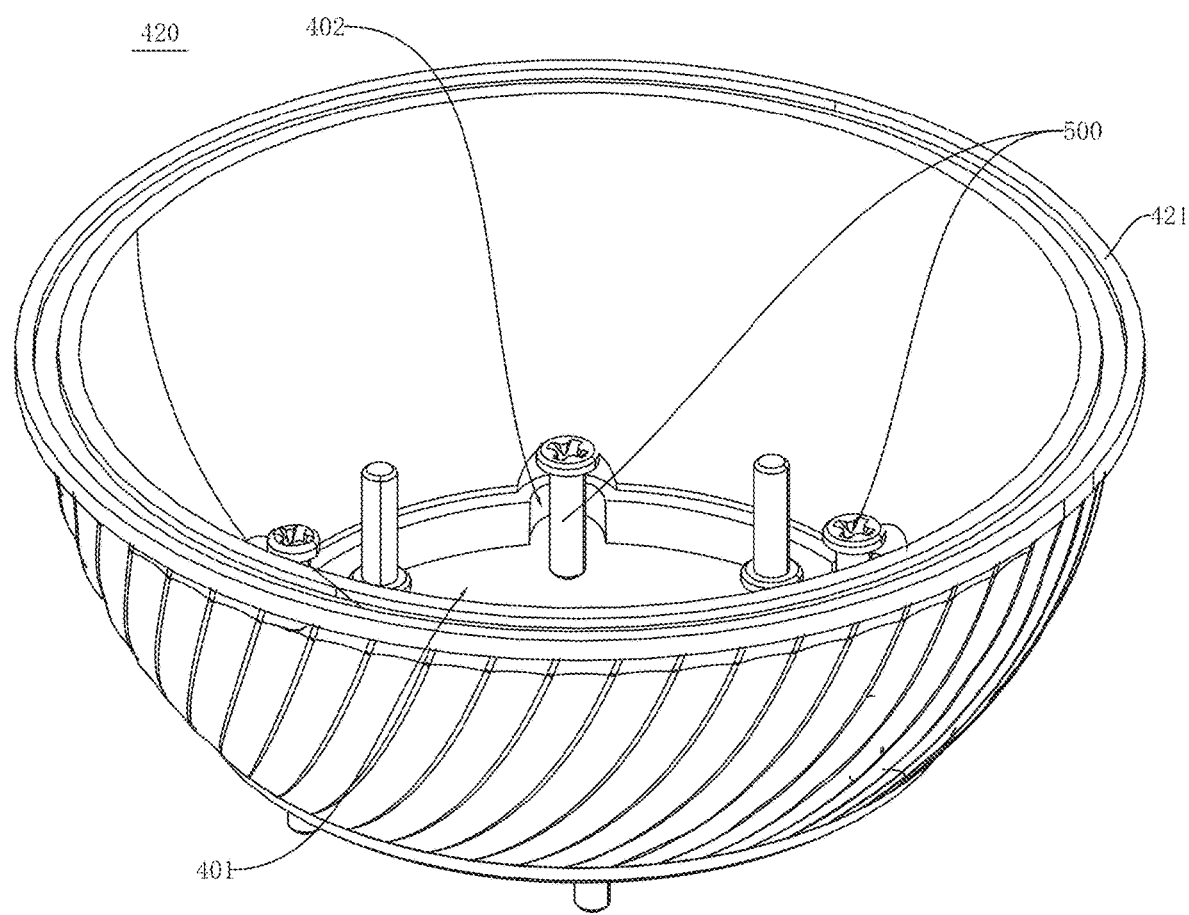
FIG. 11 is an isometric view of a lower diffuser of the lighting device in FIG. 1.

As shown in FIGS. 4 and 11, the diffuser 400 is provided with an opening 401, an inner circumference of the opening 401 is provided with a plurality of grooves 402, and a plurality of mounting projections 102 are correspondingly inserted in the plurality of grooves 402 to realize the fixation between the diffuser 400 and the lamp housing 100, which may be sufficient to improve the installation accuracy and avoid the displacement of the diffuser 400 inside the lamp housing 100.

Figure 5:
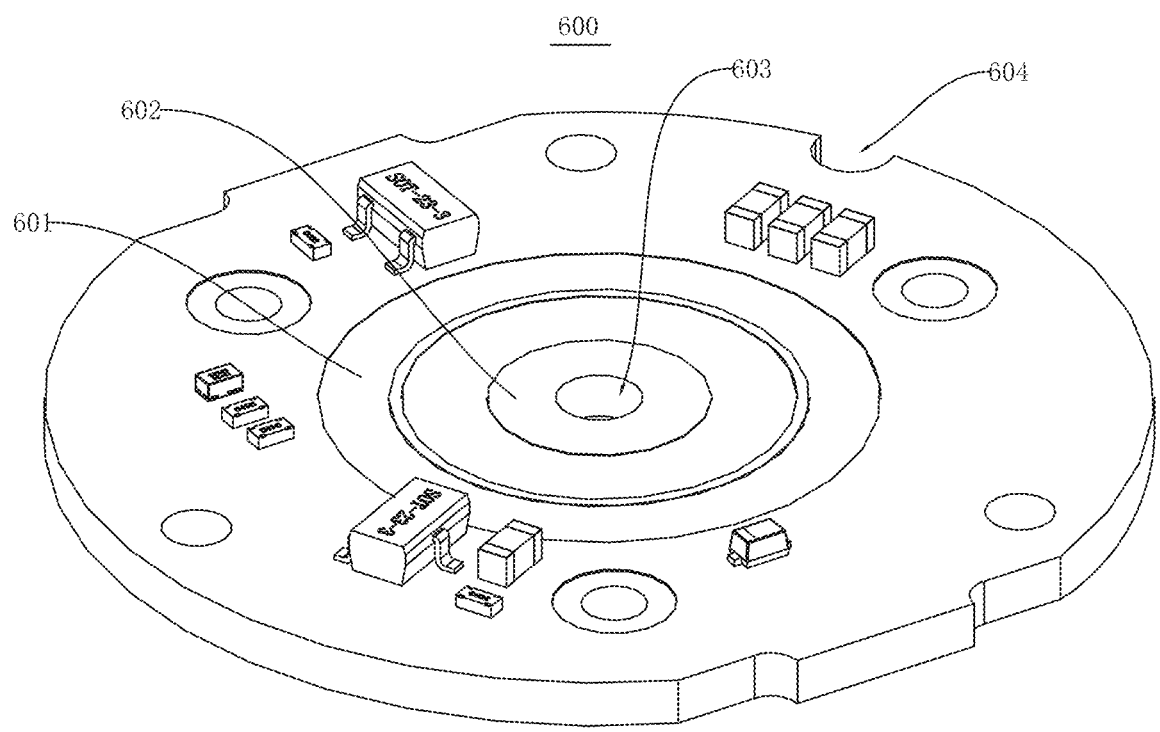
FIG. 5 is an isometric view of a second circuit board of the lighting device in FIG. 1.
Figure 6:
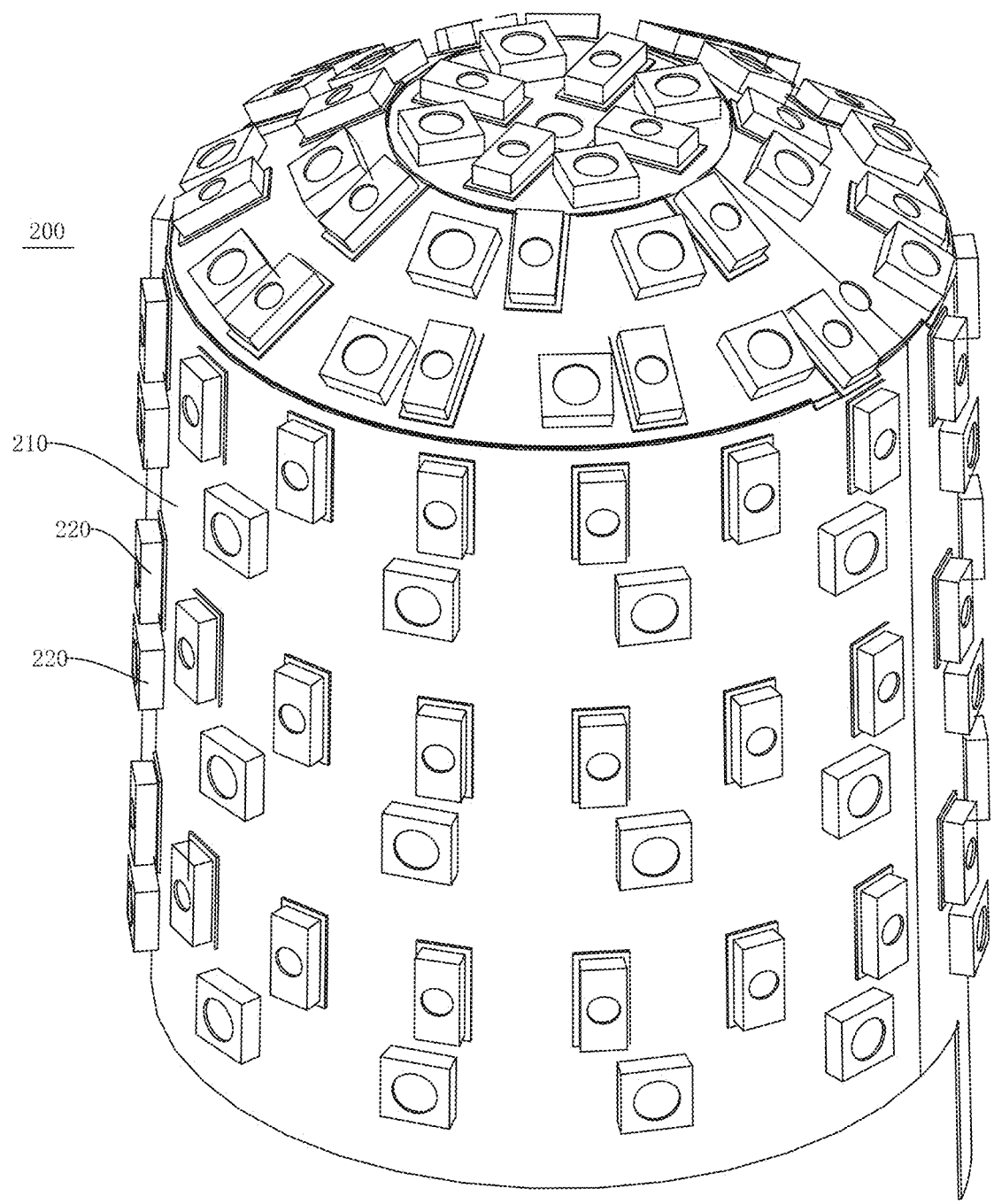
FIG. 6 is an isometric view of a lamp source assembly of the lighting device in FIG. 1.

As shown in FIGS. 1, 4 and 5, in an optional embodiment, the lighting device 1 further includes a second circuit board 600, a first resilient conductive member 610, a second resilient conductive member 620, a first charging member 630, and a second charging member 640.

The second circuit board 600 is disposed in the receiving space 101, the second circuit board 600 is provided with a first conductive area 601 and a second conductive area 602, the first conductive area 601 and the second conductive area 602 being spaced apart. One end of the first flexible conductive member 610 abuts against the first conductive area 601 and the other end abuts against the first circuit board 330, and one end of the second flexible conductive member 620 abuts against the second conductive area 602 and the other end abuts against the first circuit board 330. The first charging member 630 is disposed in the flexible portion 110 and electrically connected to the first conductive area 601. A second charging member 640 is disposed in the flexible portion 110 and is electrically connected to the second conductive area 602. The second charging member 640 is pressed against the switch 350.

Both the first resilient conductive member 610 and the second resilient conductive member 620 may be spring structures, such as coil springs. The first resilient conductive member 610 surrounds the circumference of the second resilient conductive member 620, and the second resilient conductive member 620 surrounds the switch 350. the first conductive area 601 surrounds the second conductive area 602. the first conductive area 601 is constructed as a ring. The connection area between the first conductive area 601 and the first elastic conductive member 610 reduces resistance and reduces charging heat.

The first resilient conductive member 610 and the second resilient conductive member 620 may realize an electrical connection between the first circuit board 330 and the second circuit board 600. By pressing the resilient cover 110, the first resilient conductive member 610 and the second resilient conductive member 620 are compressed to touch the second charging member 640 against the switch 350, realizing the switching of the lighting device 1. When the pressing of the resilient cover 110 is abuted, the first resilient conductive member 610 and the second resilient conductive member 620 are reset so that the resilient member may be pressed for use next time.

The first charging member 630 surrounds the second charging member 640 and can realise both the positive and negative connection of the charging device of the second circuit board 600, thereby realising the connection of the second circuit board 600, the second circuit board 600 and the battery assembly 300 to the charging device to realise the charging of the battery assembly 300.

Referring to FIG. 5, the first electrically conductive area 601 surrounds the second electrically conductive area 602, and the second electrically conductive area 602 is provided with a through-hole 603 at the center. The first charging member 630 has a plurality of first charging members 630 spaced apart along a circumferential direction of the first electrically conductive area 601, and the second charging member 640 is threaded through the through-hole 603.

By increasing the area of the first conductive area 601, thereby increasing the number of the first charging members 630, in order to increase charging speed. Since the second electrically conductive area 602 is provided with the through-hole 603, the second charging member 640 is able to abut against the switch 350 through the through-hole 603, facilitating pressing the switch 350.

Figure 2:
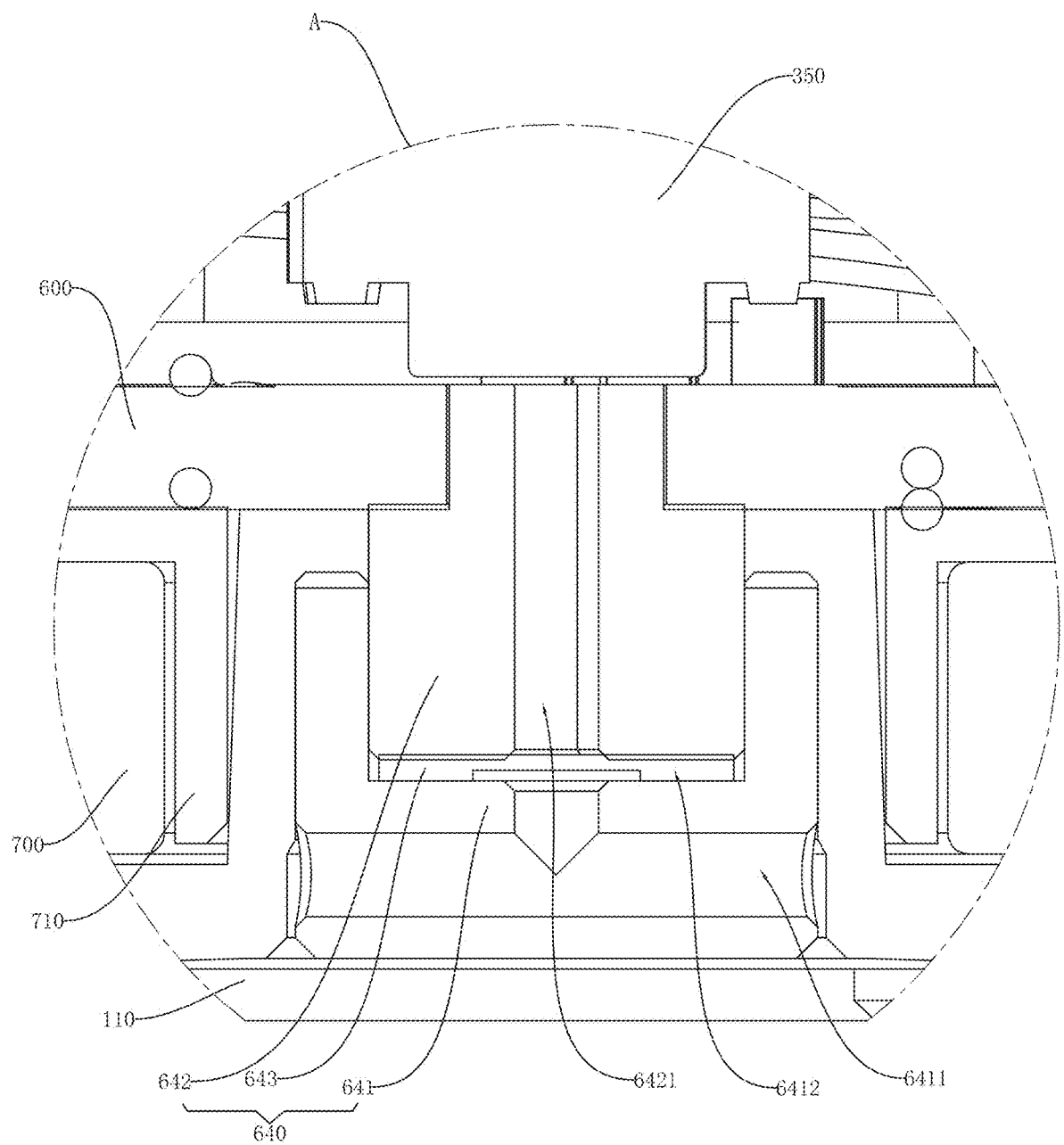
FIG. 2 is an enlarged cross-sectional view of part A of the lighting device in FIG. 1.
Figure 9:
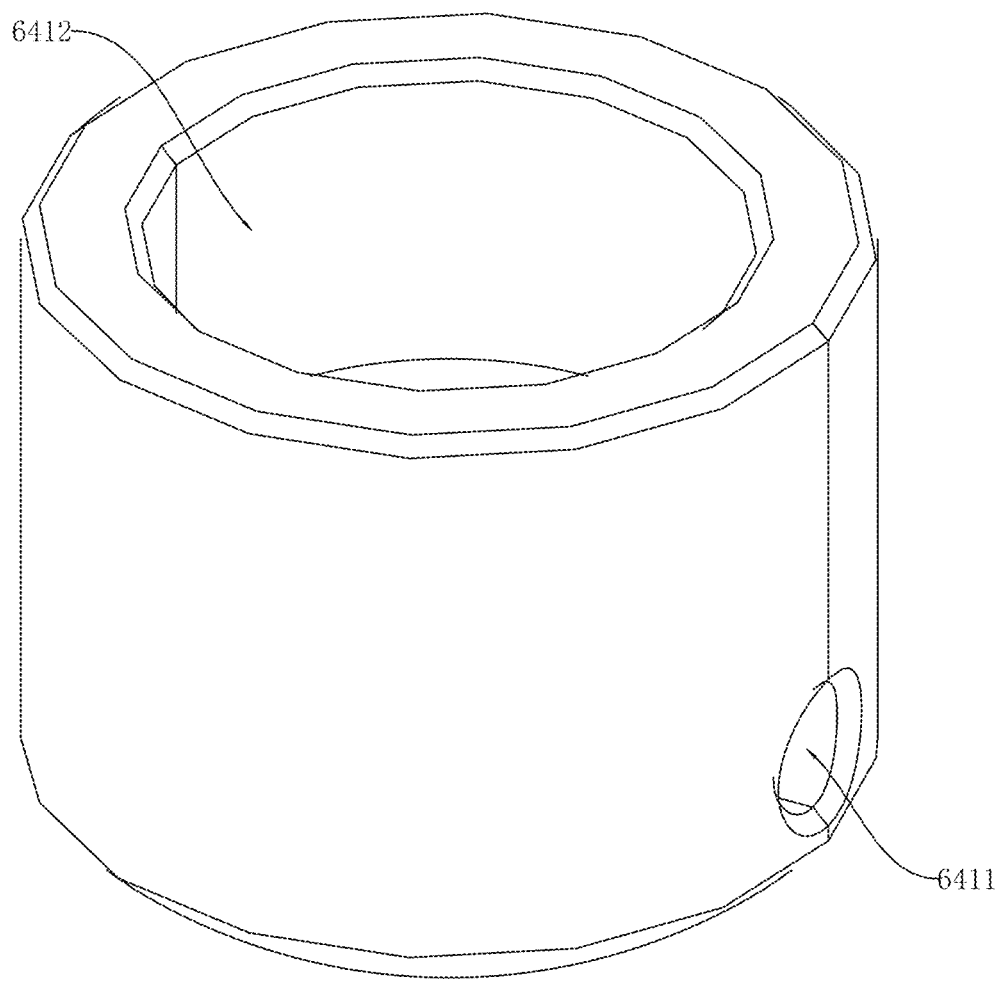
FIG. 9 is an isometric view of a first electrical connector of the lighting device in FIG. 1.
Figure 10:
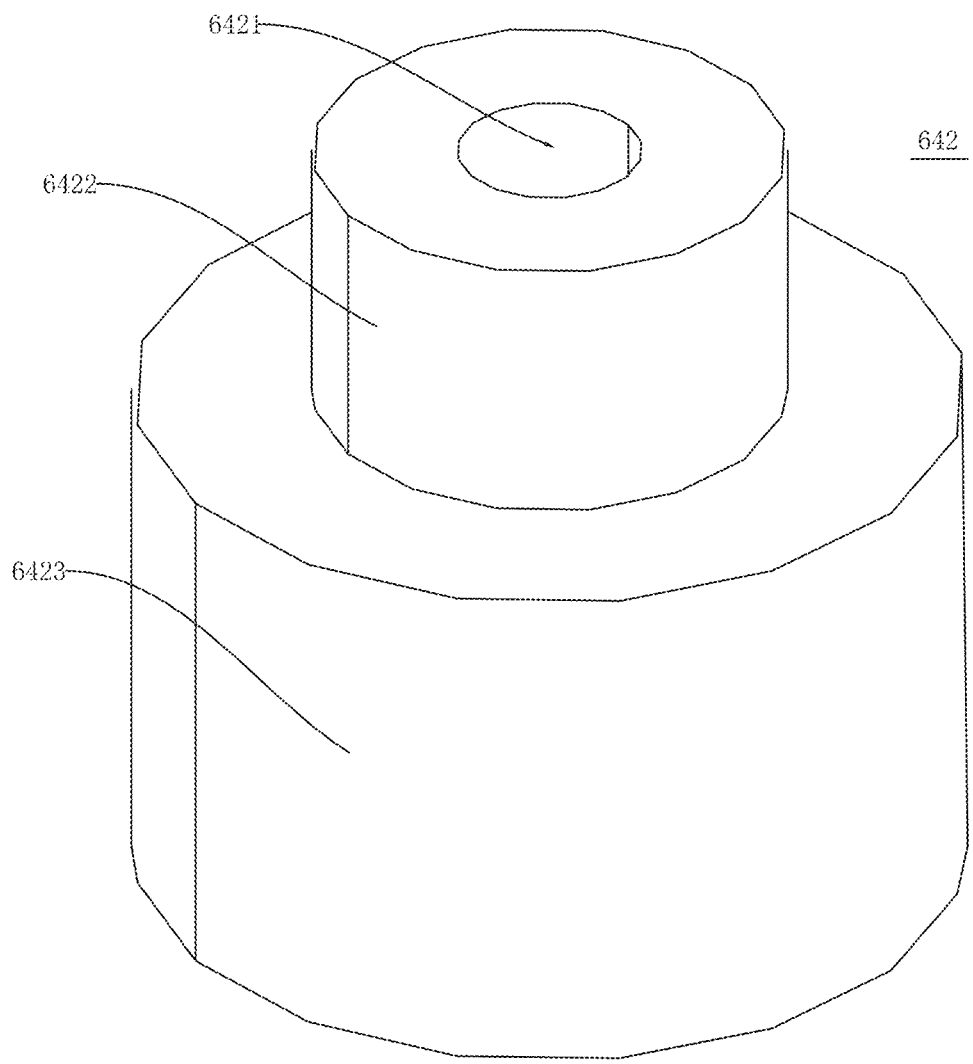
FIG. 10 is an isometric view of a second electrical connector of the lighting device in FIG. 1.

As shown in FIGS. 2, 9 and 10, the second charging member 640 includes a first electrical connector 641 shaped like an inverted hat, a cylindrical second electrical connector 642, and a waterproof breathable membrane 643. Desecond electrical connectored information is provided below.

The first electrical connector 641 is provided with a radial channel 6411 and an axial holes 6412 located in a central region. The radial channel 6411 is in communication with the axial holes 6412 and extends through the peripheral wall of the first electrical connector 641, and the axial holes 6412 extends through the side of the first electrical connector 641 facing the switch 350. The second electrical connector 642 is inserted in the axial holes 6412 and abuts against the switch 350. The second electrical connector 642 is provided with a axial channel 6421 which is connected to the axial holes 6412 of the first electrical connector 641, and a waterproof breathable membrane 643 is provided in the axial holes 6412 and is located between the second electrical connector 642 and the bottom wall of the axial holes 6412. The radial channel 6411 and axial channel 6412 are interconnected to equalize air pressure inside the lighting device.

In the embodiment, the first electrical connector 641 and the second electrical connector 642 may be glued or fitted together with interference fit. The waterproof breathable membrane 643 is sandwiched between the first electrical connector 641 and the second electrical connector 642, which facilitates the positioning between the first electrical connector 641, the second electrical connector 642, and the waterproof breathable membrane 643, and eliminates the need for the rest of the fixing structure, which reduces the cost.

When the resilient cover 110 is pressed by an external force, the volume of the lighting device 1 decreases, the air pressure inside the lighting device 1 increases, and the gas inside the lighting device 1 may be discharged outside the lighting device 1 via the axial channel 6421, the axial holes 6412, and the radial channel 6411. After the pressing of the resilient cover 110 is stopped, the resilient cover 110 springs back and returns so that the volume of the lighting device 1 slightly increases, and then air outside the lighting device 1 may enter the lighting device 1 inside via the radial holes 6411, the axial holes 6412 and the through holes 6421.

Furthermore, the breathable membrane 643 is sandwiched between the first electrical connector 641 and the second electrical connector 642, so that outside liquid will be blocked by the waterproof breathable membrane 643 when it enters the radial holes 6411, and the liquid will not enter the axial holes 6412 and the through-holes 6421, so as to avoid that the liquid enters into the lighting device 1 through the radial holes 6411, the axial holes 6412, and the through-holes 6421, and to avoid the light source assembly 200 and the battery component 300 of the lighting device 1 being short-circuiting or being corroded and damaged.

In the embodiment, the radial channel 6411 may extend in a radial direction through the first electrical connector 641. The second electrical connector 642 has a cylindrical wide segment 6423 and a fine segment 6422 extending coaxially from the wide segment 6423. The wide segment 6423 has a diameter greater than that of the fine segment 6422. The wide segment 6423 is mounted in the axial hole 6412. The wide segment 6423 abuts against the second circuit board 600 facing backward from the first circuit board 330. The fine segment 6422 is inserted into the the through-hole 603 for supporting the second circuit board 600, a magnetic ring 700 and a fixing cover 710 so that it may be ensured that the second charging member 640 does not press the switch 350 when the resilient cover 110 is not pressed so as to reduce the occurrence of misoperation.

Referring to FIGS. 1, 2, and 4, the lighting device 1 further has the magnetic ring 700 and the fixing cover 710. The lamp housing 100 has a window 114 for receiving the resilient cover 110. The resilient cover 110 mates with the lamp housing 110 to form the integrally spherical lamp housing. The resilient cover 110 includes a substrate 111 and a mounting portion 112 extending and projecting from the substrate 111. The magnetic ring 700 and the fixing cover 710 are disposed to be secured to the resilient cover 110. Specifically, an annular slot 113 is provided on the mounting portion 112 of the resilient cover 110 for receiving the magnetic ring 700, and the fixing cover 710 is secured to the mounting portion 112 for preventing the magnetic ring 700 from falling off the resilient cover 110. As a result, the magnetic ring 700, situated in the spherical housing, enables the lamp's body to be attached magnetically to any metal body, thus allowing user to position the lighting device 1 in any desired orientation.

Furthermore, the resilient cover 110 has a center recess 115 on the center region of the resilient cover 110 for accommodating the first electrical connector 641 of the second charging member 640. The wide section portion 6423 of the second electrical connector 641 is coaxially abutted against the first electrical connector 641, and the fine section portion 6422 of the second electrical connector 641 passes through the through-hole 603 of the second circuit board towards the switch 350. When the resilient cover 110 is pressed by an external force, the fine segment 6422 of the second electrical connector 642 moves toward the switch 350, thereby touching the switch 350 and thus energizing the circuit. After the external force applied to the resilient cover 110 is released, the fine segment 6422 moves away from the switch 350 under the reaction force of the first resilient conductive member 610 and second resilient conductive member 620.

Obviously, at least a portion of each of the first electrical connector 641 and second electrical connector 642 and the waterproof breathable membrane 643 sandwiched therebetween are placed in the center recess 115. The wide segment 6423 is inserted into the axial holes 6412 of the first electrical connector 641 such that the first electrical connector 641 and second electrical connector 642 are coaxially coupled together.

Figure 3:
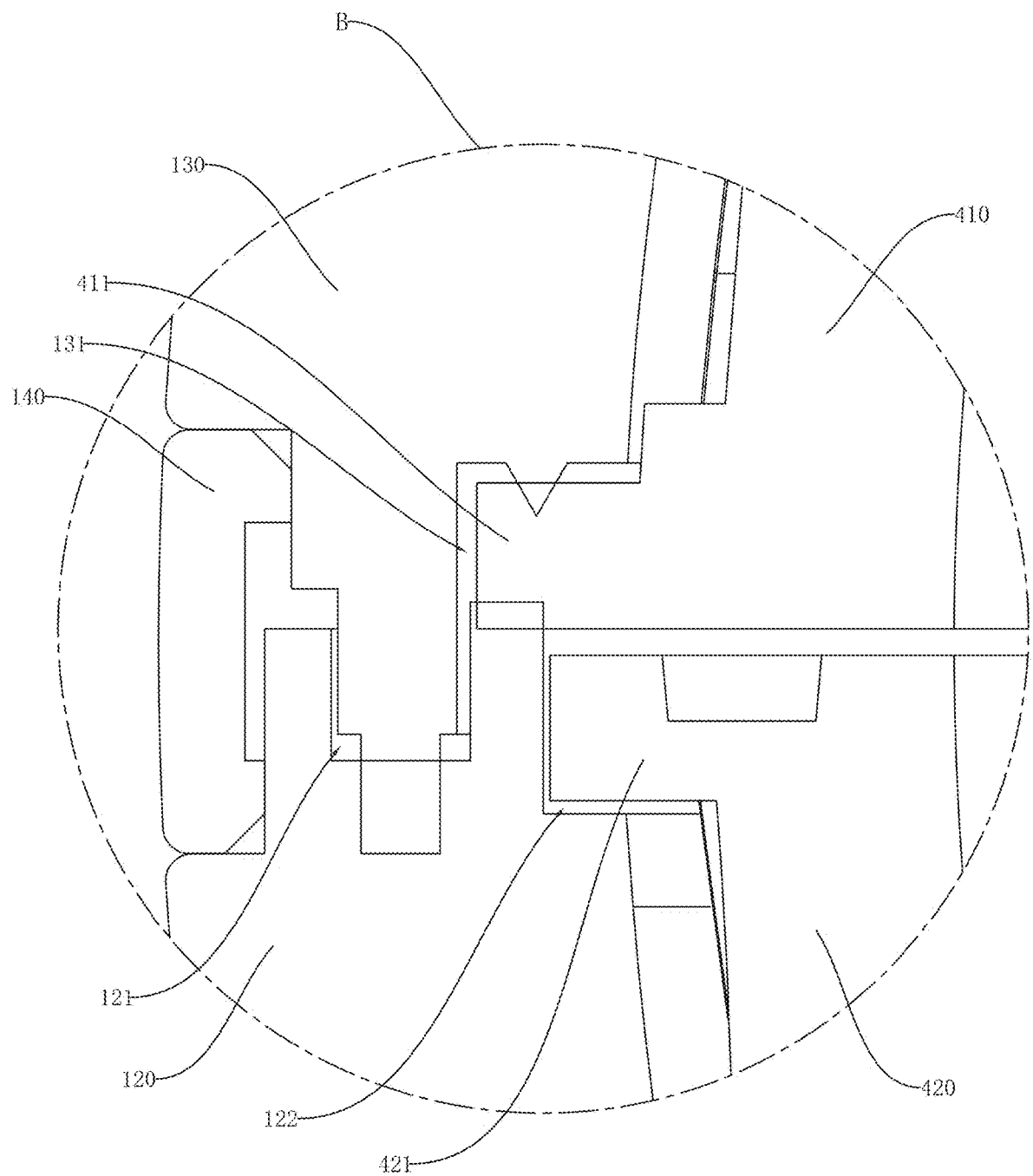
FIG. 3 is an enlarged cross-sectional view of part B of the lighting device in FIG. 1.
Figure 8:
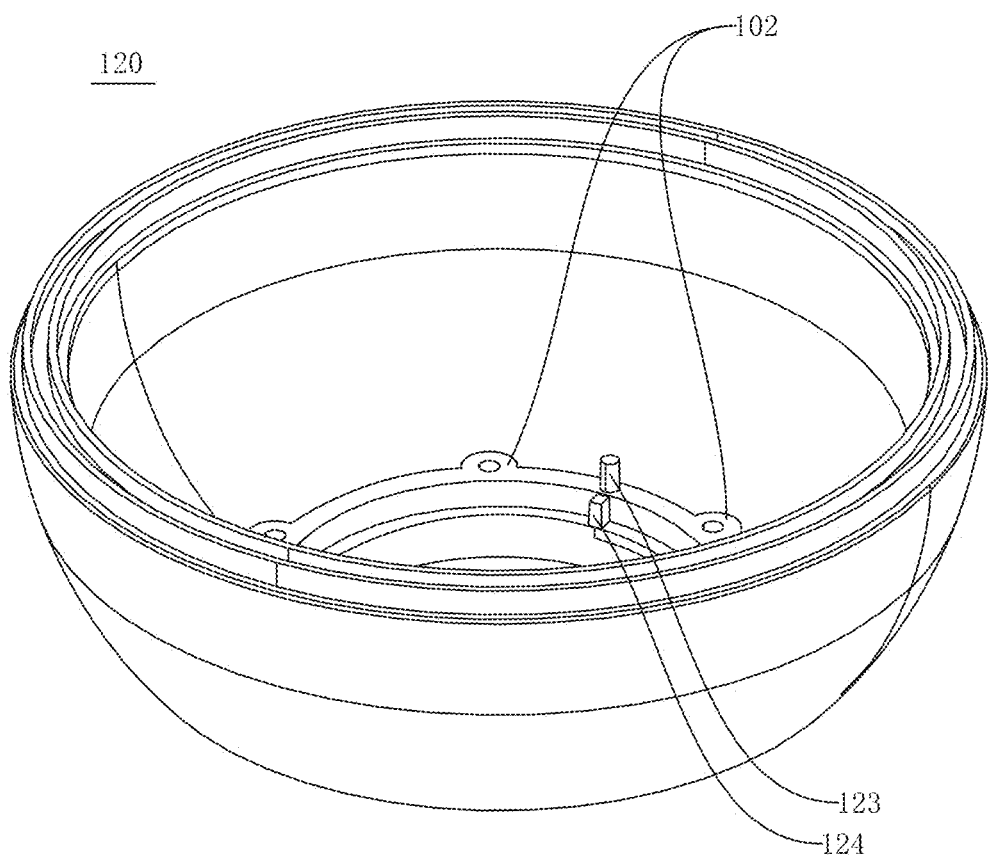
FIG. 8 is an isometric view of a lower lamp shell of the lighting device in FIG. 1.

Referring to FIGS. 1, 3 and 8, the lamp housing 100 comprises a lower lamp shell 120 having a substantially hemispherical shape, an upper lamp shell 130 having a integrally hemispherical shape, a hinge ring 140 and a mounting groove 121 is provided in a peripheral edge of the lower lamp shell 120. A peripheral edge of the upper lamp shell 130 is inserted into the mounting groove 121 of the lower lamp shell 120. The hinge ring 140 is provided at the interface between the lower lamp shell 120 and the upper lamp shell 130 so that the lamp housing 100 is in the shape of a sphere with a smooth surface. The outer surface of the hinge ring 140, the outer surface of the lower lamp shell 120 and the outer surface of the upper lamp shell 130 may be arranged on the same spherical surface to avoid steps on the outer surface of the lighting device 1, to reduce the accumulation of dust for easy cleaning.

The lower lamp shell 120 is provided with a positioning post 123 and a positioning block 124. The battery compartment 310 is provided with a positioning hole 312, and the positioning hole 312 cooperates with the positioning post 123 to achieve a pre-positioning between the lower lamp shell 120 and the battery compartment 310, which in turn facilitates a fit between the mounting lugs 311 and the mounting protrusions 102. The first circuit board 330 is mounted on the battery compartment 310.

The second circuit board 600 is provided with a positioning notch 604 on the periphery, and the positioning notch 604 cooperates with the positioning block 124 to achieve pre-positioning between the lower lamp shell 120 and the second circuit board 600, which in turn allows the first circuit board 330 and the second circuit board 600 to have a gap between the first circuit board 330 and the second circuit board 600. The first resilient conductive member 610 and the second resilient conductive member 620 are disposed in the gap for electrically conducting the first circuit board 330 and the second circuit board 600.

Referring to FIGS. 1, 3 and 4, the diffuser 400 of similar structure to the lamp housing includes an upper diffuser 410 and a lower diffuser 420. The upper diffuser 410 and the lower diffuser 420 are mated with the arranged upper lamp shell 130 and the lower shell 120, respectively. The upper lamp shell 130 is provided with a first positioning slot 131 on the inner surface, the upper diffuser 410 is provided with a first annular edge 411 on the outer peripheral surface, the first annular edge 411 is inserted into the first positioning slot 131, and the upper lamp shell 130 and the lower lamp shell 120 jointly clamp the first annular edge 411. The outer surface of the upper diffuser 410 is further provided with a plurality of prongs. The plurality of prongs being spaced along an axial direction of the upper diffuser 410 to enhance the diffusion ability of the upper diffuser 410 for light. Similarly, the lower diffuser has a plurality of prongs similar to the upper diffuser.

The inner surface of the lower lamp shell 120 is provided with a second positioning slot 122, and the outer periphery of the lower diffuser 420 is provided with a second annular edge 421. The second annular edge 421 is inserted into the second positioning slot 122, and the upper diffuser 410 and the lower lamp housing 120 jointly clamp the second annular edge 421. By means of the above construction, the diffuser 400 is stably and firmly arranged inside the lamp housing 100.

In this embodiment, the second circuit board 600 is supported by the fixing cover 710 which is seated on the second electrical connector 642. The first resilient conductive member 610 and the second resilient conductive member 620 in the gap are both in the form of helical spring wires sandwiched between the first circuit board 330 and the second circuit board for providing a restoring force to the resilient cover 110. The first board 300 serves as a cover, which is thrown into the opening of the battery compartment 310. The battery assembly 300 is mounted in the battery compartment 310 for electrically connecting the first circuit board 330 to supply electrical power to the lamp source assembly 200. The the battery compartment 310 is arranged in the internal cavity of the diffuser 400. In other words, the battery compartment 310 is inverted in the lighting device 1. The open edges of the battery compartment 310 is supported by either the lower diffuser 421 or the lower lamp shell 120.

The lighting device 1 provided by the present disclosure is capable of maximising the unobstructed placement of the light source assembly 200 in the lamp housing 100, achieving substantially fast and nearly 360 degree illumination in the direction of illumination of the light source assembly 200, and illuminating a wide area. By means of the magnetic ring 700 at the bottom of the lamp housing 100, the spherical lighting device 1 can be magnetically attached to any metal body with unlimited mounting angles.

While the present disclosure has been descirbed with reference to a specific embodiment, the description of the disclosure is illustrative and is not to be construed as limiting the disclosure. Various of modifications to the present disclosure can be made to the exemplary embodiment by those skilled in the art without departing from the ture spirit and scope of the disclosure as defined by the appended claims.

What is claimed is:

1. A lighting device comprising:
a lamp housing having a spherical receiving space;
a lamp source assembly disposed in the spherical receiving space of the lamp housing;
a diffuser, and wherein
the lamp source assembly has a flexible circuit board and a plurality of lamp beads disposed on the flexible circuit board, the flexible circuit board defining a holding cavity in the shape of a cylinder;
a battery assembly is electrically connected to the flexible circuit board, at least a portion of the battery assembly being received inside the holding cavity of the flexible circuit board, the battery assembly having a battery compartment mated with the holding cavity, a battery disposed in the battery compartment, a first circuit board connected with the battery compartment, a flexible gasket sandwiched between the first circuit board and the battery for protecting the battery, and a switch disposed on the first circuit board and away from the flexible gasket;
the lamp housing further has a resilient cover corresponding to the switch and capable of activating the switch when pressed by an external force;
the diffuser is disposed inside the spherical receiving space and received between the lamp source assembly and the lamp housing.

2. The lighting device as described in claim 1, wherein the lamp housing includes a lower lamp shell defining a substantially hemispherical shape, an upper lamp shell defining an integrally hemispherical shape, a hinge ring sandwiched between the upper lamp shell and the lower lamp shell and a mounting groove provided in a peripheral edge of the lower lamp shell, the upper lamp shell cooperating with the lower lamp shell, the hinge ring, and the resilient cover to form a device having a spherical shape with a smooth surface.

3. The lighting device as described in claim 2, wherein the diffuser includes an upper diffuser matched to the upper lamp shell and a lower diffuser matched to the lower lamp shell, each of the upper diffuser and the lower diffuser having a plurality of prongs for refracting light.

4. The lighting device as described in claim 1, wherein the resilient cover includes a substrate cooperating with the lower lamp shell and a mounting portion extending from the substrate and protruding toward the receiving space of the lamp housing, the mounting portion being used to support a second charging member capable of activating the switch on the first circuit board, a first charging member surrounding the second charging member.

5. The lighting device as described in claim 4, wherein an annular slot is defined on the mounting portion of the resilient cover for receiving a magnetic ring.

6. The lighting device as described in claim 5, wherein a fixing cover is provided on the mounting portion of the resilient cover for preventing the magnetic ring from falling off the resilient cover.

7. The lighting device as described in claim 4, wherein a second circuit board is disposed on the mounting portion of the resilient cover to form a gap with the first circuit board, a first resilient conductive member and a second resilient conductive member are accommodated in the gap for electrical connection.

8. The lighting device as described in claim 7, wherein at least one of the first resilient conductive member and the second resilient conductive member is in the shape of a coil spring.

9. The lighting device as described in claim 7, wherein the second charging member includes a first electrical connector disposed on the mounting portion of the resilient cover and a second electrical connector coaxially connected to the first electrical connector.

10. The lighting device as described in claim 9, wherein the second electrical connector has a cylindrical wide segment connected with the first electrical connector and a fine segment extending coaxially from the wide segment.

11. The lighting device as described in claim 10, wherein the wide segment of the second electrical connector abutts against the second circuit board.

12. The lighting device as described in claim 11, wherein the fine segment of the second electrical connector extends through a through hole of the second circuit board towards the switch on the first circuit board.

13. The lighting device as described in claim 9, wherein a radial channel is provided inside the first electrical connector and an axial channel is provided inside the second electrical connector, the radial channel and axial channel being connected to each other to equalize air pressure inside the lighting device.

14. The lighting device as described in claim 13, wherein a waterproof breathable membrane is sandwiched between the first electrical connector and the second electrical connector.

* * * * *